United States Patent
Chen et al.

(10) Patent No.: US 12,197,708 B2
(45) Date of Patent: Jan. 14, 2025

(54) MESSAGE DISPLAY METHOD AND APPARATUS, DEVICE AND STORAGE MEDIUM

(71) Applicant: Beijing Zitiao Network Technology Co., Ltd., Beijing (CN)

(72) Inventors: Shuyu Chen, Beijing (CN); Weiyi Chang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/622,475

(22) Filed: Mar. 29, 2024

(65) Prior Publication Data
US 2024/0241626 A1 Jul. 18, 2024

Related U.S. Application Data

(63) Continuation of application No. PCT/CN2023/072849, filed on Jan. 18, 2023.

(30) Foreign Application Priority Data

Jan. 29, 2022 (CN) .......................... 202210112909.0

(51) Int. Cl.
G06F 3/0484 (2022.01)
H04L 51/04 (2022.01)
(Continued)

(52) U.S. Cl.
CPC ............ *G06F 3/0484* (2013.01); *H04L 51/04* (2013.01); *H04L 51/046* (2013.01);
(Continued)

(58) Field of Classification Search
CPC ..... G06F 3/0484; H04L 51/04; H04L 51/046; H04L 51/216; H04L 51/224; H04N 21/4316; H04N 21/4788; H04N 21/4882
See application file for complete search history.

(56) References Cited

U.S. PATENT DOCUMENTS

2004/0098754 A1* 5/2004 Vella .................. H04N 21/4722
                                                            725/135
2009/0183220 A1* 7/2009 Amento ............. H04N 21/4788
                                                            725/120
(Continued)

FOREIGN PATENT DOCUMENTS

CN         109842819 A       6/2019
CN         110134481 A       8/2019
(Continued)

OTHER PUBLICATIONS

ISA China National Intellectual Property Administration, International Search Report Issued in Application No. PCT/CN2023/072849, Mar. 21, 2023, WIPO, 7 pages.
(Continued)

*Primary Examiner* — Nicholas Ulrich
(74) *Attorney, Agent, or Firm* — Alleman Hall & Tuttle LLP

(57) ABSTRACT

Embodiments of the present application disclose a message display method and apparatus, a device, and a storage medium. The method comprises: displaying a content sharing interface when target users perform content sharing; and when an interactive message is displayed using a first preset mode on the content sharing interface, in response to a trigger operation triggering interactive message input, perform switching from displaying the interactive message using the first preset mode to displaying the interactive message using a second preset mode, wherein displaying using the first preset mode is associated with a reception time of the interactive message, and displaying in the second preset mode is associated with interaction process data of the target user.

19 Claims, 6 Drawing Sheets

(51) Int. Cl.
*H04L 51/046* (2022.01)
*H04L 51/216* (2022.01)
*H04L 51/224* (2022.01)
*H04N 21/431* (2011.01)
*H04N 21/4788* (2011.01)
*H04N 21/488* (2011.01)

(52) U.S. Cl.
CPC .......... *H04L 51/216* (2022.05); *H04L 51/224* (2022.05); *H04N 21/4316* (2013.01); *H04N 21/4788* (2013.01); *H04N 21/4882* (2013.01)

(56) References Cited

U.S. PATENT DOCUMENTS

| | | | | |
|---|---|---|---|---|
| 2009/0249223 | A1* | 10/2009 | Barsook | H04N 7/15 715/753 |
| 2014/0317660 | A1* | 10/2014 | Cheung | H04N 21/4316 725/38 |
| 2015/0358584 | A1* | 12/2015 | Mattson | G06Q 10/101 348/14.08 |
| 2017/0093769 | A1* | 3/2017 | Lind | G06F 3/1454 |
| 2018/0027298 | A1* | 1/2018 | Paglia | H04N 21/2668 725/37 |

FOREIGN PATENT DOCUMENTS

| | | | |
|---|---|---|---|
| CN | 113014732 | A | 6/2021 |
| CN | 113489937 | A | 10/2021 |
| CN | 114443201 | A | 5/2022 |

OTHER PUBLICATIONS

ISA China National Intellectual Property Administration, Written Opinion of the International Searching Authority Issued in Application No. PCT/CN2023/072849, Mar. 10, 2023, WIPO, 5 pages.
"NetEase Cloud can actually listen to songs together," Douyin.com, Available Online at www.douyin.com/video/6931692703335910664, Feb. 21, 2021, 4 pages. Submitted with partial English translation.

* cited by examiner

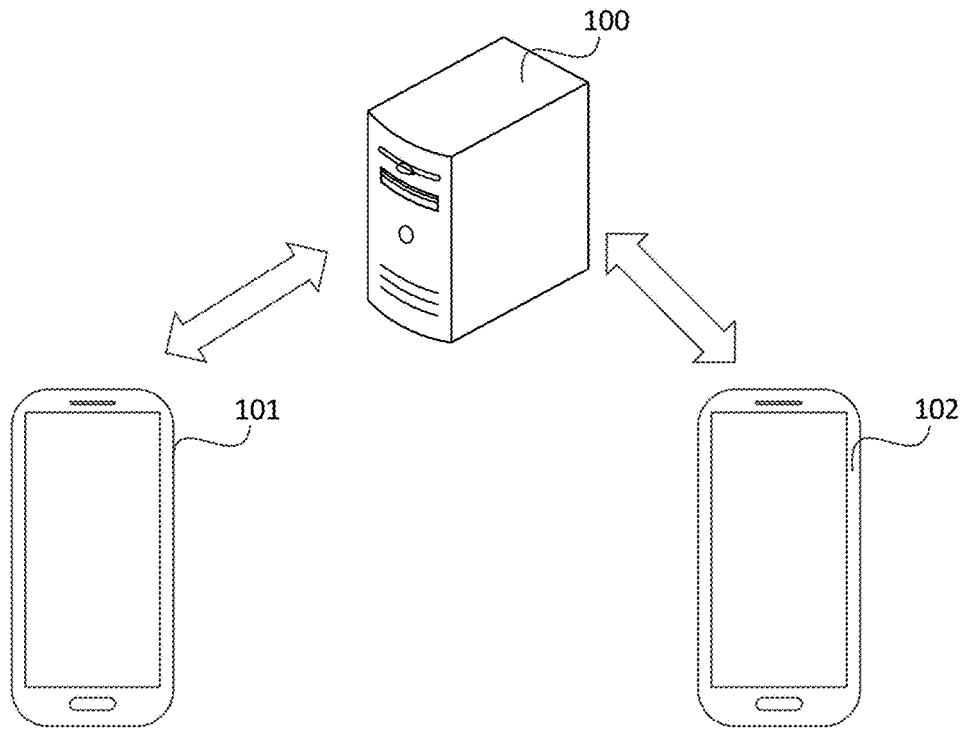

FIG. 1

| Display a content sharing interface in a content sharing event of target users, wherein a number of target users is at least two, and the content sharing interface is used for displaying preset media content shared among the target users and interactive messages sent by the target users in the content sharing event | ~ 201 |

| In the process of displaying the interactive messages in the content sharing interface in a first preset mode, in response to a first trigger operation of the target users for inputting the interactive messages, switch, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users | ~ 202 |

FIG. 2

MESSAGE DISPLAY METHOD AND APPARATUS, DEVICE AND STORAGE MEDIUM

CROSS-REFERENCE TO RELATED APPLICATION(S)

The present disclosure is a Continuation Application of International Patent Application No. PCT/CN2023/072849, filed on Jan. 18, 2023, which claims the priority to Chinese application Ser. No. 202210112909.0, filed in the China Patent Office on Jan. 29, 2022, and the disclosures of which are incorporated herein by reference in their entities.

FIELD

Embodiments of the present disclosure relate to the technical field of computers, for example, to a message display method and apparatus, a device and a storage medium.

BACKGROUND

With the rapid development of Internet technologies and terminal technologies, interaction between users becomes more and more convenient.

SUMMARY

Embodiments of the present disclosure provide a message display method and apparatus, a storage medium and a device.

In a first aspect, an embodiment of the present disclosure provides a message display method, including:
  displaying a content sharing interface in a content sharing event of target users, wherein a number of target users is at least two, and the content sharing interface is used for displaying preset media content shared among the target users and interactive messages sent by the target users in the content sharing event; and
  in the process of displaying the interactive messages in the content sharing interface in a first preset mode, in response to a first trigger operation of the target users for triggering the input of the interactive messages, switching, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

In a second aspect, an embodiment of the present disclosure provides a message display apparatus, including:
  a content sharing interface display module, configured to display a content sharing interface in a content sharing event of target users, wherein a number of target users is at least two, and the content sharing interface is used for displaying preset media content shared among the target users and interactive messages sent by the target users in the content sharing event; and
  a message display module, configured to: in the process of displaying the interactive messages in the content sharing interface in a first preset mode, in response to a first trigger operation of the target users for triggering the input of the interactive messages, switch, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

In a third aspect, an embodiment of the present disclosure provides an electronic device, including a memory, a processor, and a computer program stored on the memory and executable on the processor, wherein the processor implements, when executing the computer program, the message display method provided in the embodiment of the present disclosure.

In a fourth aspect, an embodiment of the present disclosure provides a computer-readable storage medium, on which a computer program is stored, wherein the computer program implements, when being executed by a processor, the message display method provided in the embodiment of the present disclosure.

BRIEF DESCRIPTION OF THE DRAWINGS

FIG. 1 is a scenario architecture diagram of an application scenario to which a message display method provided in an embodiment of the present disclosure is applicable;

FIG. 2 is a schematic flowchart of a message display method provided in an embodiment of the present disclosure;

DETAILED DESCRIPTION OF EMBODIMENTS

Figure 3:
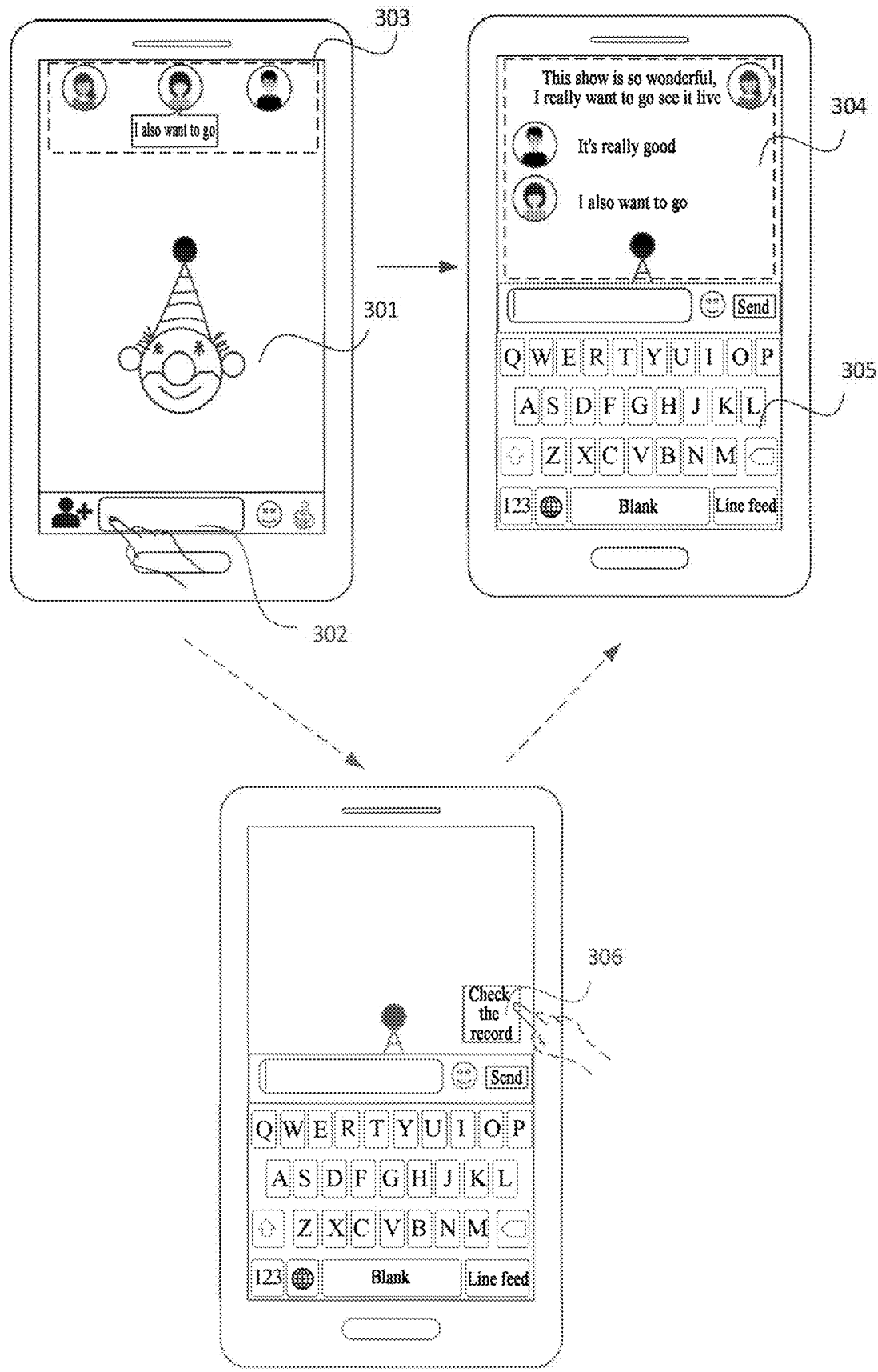
FIG. 3 is a schematic interface diagram of a message display mode switching process provided in an embodiment of the present disclosure.

Hereinafter, embodiments of the present disclosure will be described with reference to the drawings. Although some embodiments of the present disclosure have been illustrated in the drawings, it should be understood that the present disclosure may be implemented in various forms, and these embodiments are provided to help understand the present disclosure more thoroughly and completely. It should be understood that the drawings and embodiments of the present disclosure are for exemplary purposes only.

It should be understood that, various steps recorded in method embodiments of the present disclosure may be executed in different sequences and/or in parallel. In addition, the method embodiments may include additional steps and/or omit executing the steps shown.

As used herein, the terms "include" and variations thereof are open-ended terms, i.e., "including, but not limited to". The term "based on" is "based, at least in part, on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that, concepts such as "first" and "second" mentioned in the present disclosure are only intended to distinguish different apparatuses, modules or units.

It should be noted that, the modifiers of "one" and "more" mentioned in the present disclosure are illustrative, and those skilled in the art should understand that the modifiers should be interpreted as "one or more" unless the context clearly indicates otherwise.

The names of messages or information interacted between a plurality of apparatuses in the embodiments of the present disclosure are for illustrative purposes only.

In the following embodiments, optional features and examples are provided in each embodiment at the same time, and various features recorded in the embodiments may be combined to form a plurality of optional solutions, and the embodiment of each serial number should not be considered as only one technical solution.

The same video stream content may be shared among a plurality of users, the users performing video sharing may communicate with each other via real-time voice, and may also communicate with each other via messages in the form of texts or pictures. In order to improve the user effect, the message display manner needs to be optimized.

FIG. 1 is a scenario architecture diagram of an application scenario to which a message display method provided in an embodiment of the present disclosure is applicable. Exemplarily, referring to FIG. 1, the application scenario may include a server 100, a first electronic device 101 and a second electronic device 102. It should be noted that, there may be more electronic devices, and FIG. 1 is merely a schematic illustration. A plurality of electronic devices establish a communication connection with the server to implement information interaction. The electronic device may be a mobile device such as a mobile phone, a smart watch, a tablet computer and a personal digital assistant, and may also be other devices such as a desktop computer. Users using the electronic devices may perform real-time calls, content sharing and message interaction and the like via preset network platforms installed on the electronic devices, and in the embodiment of the present disclosure, content sharing in a call process may be referred to as call sharing, wherein the preset network platform may be a preset website or a preset application program, and the server may provide a support for the preset network platform.

FIG. 2 is a schematic flowchart of a message display method provided in an embodiment of the present disclosure, and the method may be executed by a message display apparatus, wherein the apparatus may be implemented by software and/or hardware, and may generally be integrated in an electronic device, for example, may be an electronic device used by any user participating in content sharing. As shown in FIG. 2, the method includes:

Step 201, displaying a content sharing interface in a content sharing event of target users, wherein a number of target users is at least two, and the content sharing interface is used for displaying preset media content shared among the target users and interactive messages sent by the target users in the content sharing event.

In the embodiment of the present disclosure, two or more users may be supported for real-time content sharing, and the target users may be understood as users participating in content sharing. Message interaction may also be performed while content sharing is performed, and a real-time call (e.g., a voice call or a video call or the like) may also be performed. For a call sharing scenario, in order to meet content sharing requirements between the users, the content sharing interface may be displayed in a call process, and in a display process of the content sharing interface, the real-time call between the users may be maintained, that is, the users participating in the call may continue to the call while checking the content sharing interface.

Exemplarily, the content sharing interface may be a interface in the preset application program. The content sharing interface is used for displaying preset media content shared among the target users, and a specific form of the preset media content may be set according to actual requirements, for example, may be a video, an image, a document, or other forms of content, etc. The preset media content may be set by any target user or a specified target user. The content sharing interface is further used for displaying the interactive messages sent by the target users in the content sharing event, and content included in the interactive messages may be set according to actual requirements, for example, may include content such as character strings or expression pictures, etc. Optionally, the content sharing interface may be further used for displaying a message input control, the message input control is used for triggering an interactive message input event, and the display form of the message input control may be set according to actual requirements, for example, may be an input box located at the bottom of the content sharing interface.

Step 202, in the process of displaying the interactive messages in the content sharing interface in a first preset mode, in response to a first trigger operation of the target users for triggering the input of the interactive messages, switching, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

It can be understood that, the first trigger operation of the target users for triggering the input of the interactive messages may be a first trigger operation for the message input control or the displayed interactive messages, and may also be a preset gesture operation. Exemplarily, when the target users trigger the input of the interactive messages, an input cursor is displayed in the message input panel.

In the embodiment of the present disclosure, at least two display modes are set for the display of the interactive messages, and two of which are respectively denoted as the first preset mode and the second preset mode.

The display of the interactive messages in the first preset mode is associated with the receiving time of the interactive messages, and the specific association manner may be set according to actual requirements, for example, the interactive messages closest to the current moment may be dynamically displayed for a set duration, or, the display starting and ending time are determined according to the receiving time of the interactive messages, etc.

Optionally, in the first preset mode, the currently received interactive message is displayed for the set duration, that is, after the interactive message sent by a certain target user is received, the interactive message is displayed, and the display of the interactive message is stopped after the set duration, thereby shortening the time of occluding the preset media content. Optionally, the set duration may be a preset fixed duration, and may also be a duration that is dynamically adjusted according to actual situations. For example, when the message interaction frequency among the target users is relatively high and a plurality of interactive messages are received within a short time, the set duration may be reduced to reduce the probability or duration of simultaneous displaying the plurality of interactive messages. As another example, the set duration may be determined according to the receiving moment of the next interactive message, for example, in the display process of the current interactive message, if a new interactive message is received, it can be considered that the displayed duration of the currently displayed interactive message reaches the set duration, then the display of the current interactive message is stopped, and the new interactive message is displayed, so that one interactive message is displayed at the same moment, and the occlusion degree of the preset media content is reduced. When the interactive messages are displayed in the first preset mode, occlusion and interference on the preset media content are less, so that the target users can better focus on the preset media content, thereby improving the viewing effect.

Optionally, in the first preset mode, the currently received interactive message may be displayed in a first preset region for the set duration. To avoid excessive occlusion on the preset media content, the first preset region may be located at or close to a boundary of the content sharing interface, such as the top of the interface, the bottom of the interface, a left boundary of the interface or a boundary of the interface, etc.

The display of the interactive messages in the second preset mode is associated with the interaction process data of the target users, and the specific association manner may be set according to actual requirements, for example, an interactive message record may be displayed, or the interactive messages sent by the target users are aggregated and displayed by using the target users as dimensions.

Optionally, in the second preset mode, the interactive message record is displayed. The interactive message record may be understood as a plurality of interactive messages that are sorted according to a time sequence, a set number of recently received interactive messages may be displayed at an initial moment of switching to the second preset mode, and the set number may be dynamically determined according to the size of a second preset region used for displaying the interactive message record in the content sharing interface, and the area of a display region to be occupied by the interactive messages. Optionally, after a preset gesture operation input by a target user is received, earlier interactive messages may be displayed. In the process of displaying the interactive message record, in response to receiving a new interactive message, the interactive message record may be updated in real time, and thus real-time message interaction can be implemented. When the interactive messages are displayed in the second preset mode, compared with the first preset mode, the target user may check more message content, and comprehensively understand the message interaction process, so as to better perform message interaction with other users, thus meeting the message interaction requirements of the users.

In the embodiment of the present disclosure, in the process of displaying the interactive messages in the content sharing interface in the first preset mode, any target user may input, on the basis of the content sharing interface in an electronic device used by the target user himself/herself, the first trigger operation for triggering the input of the interactive messages, at this time, it can be determined that the target user has a message record check requirement, so that it is switched from the first preset mode to the second preset mode, and then the target user can more accurately and efficiently input message content on the basis of the message interaction record. The type of the first trigger operation may be set according to actual requirements, for example, may be a click or a long press, etc.

Exemplarily, in the process of displaying the interactive messages in the content sharing interface in the first preset mode, the display of the preset media content is maintained in the content sharing interface, and after it is switched, in the content sharing interface, from displaying the interactive messages in the first preset mode to displaying the interactive messages in the second preset mode, the display of the preset media content is continued in the content sharing interface. Similarly, after it is switched back to display the interactive messages in the content sharing interface in the first preset mode, the display of the preset media content is still continued in the content sharing interface. For example, the preset media content is a video, in the process of displaying a shared video and the interactive messages in the first preset mode in the content sharing interface, if it is switched to display the interactive messages in the second preset mode, the playback of the shared video is continued in the content sharing interface, and the interactive messages are displayed in the second preset mode.

FIG. 3 is a schematic interface diagram of a message display mode switching process provided in an embodiment of the present disclosure, assuming that the target users include a user A, a user B and a user C, and FIG. 3 shows a content sharing interface in an electronic device used by the user C. As shown in FIG. 3, the preset media content, which is being displayed in the content sharing interface, is a clown video 301, and a message input control 302 is displayed at the bottom of the interface. The interactive messages are displayed in the first preset mode in a top left interface diagram, for example, the currently received interactive message is "I also want to go" sent by the user A, the interactive message is displayed in a first preset region 303 for a set duration, and the set duration is, for example, 1 second. After the user C clicks the message input control 302, it is switched from displaying the interactive message in the first preset mode to displaying the interactive message in the second preset mode, that is, an interactive message record is displayed, and as shown in a top right interface diagram in FIG. 3, the interactive message record is displayed in a second preset region 304, the user C firstly sends "This show is so wonderful, I really want to go see it live", the user B agrees and sends "It's really good", the user A responds to the user C and sends "I also want to go", at this time, the interaction process may be comprehensively displayed to the user C, so as to help the user C to more accurately and efficiently input interaction message content that the user C wants to send. The specific size and position of the second preset region 304 may be set according to actual requirements, for example, the second preset region may also be the entire screen, that is, the size is consistent with the size of the screen, so that more interactive message records can be displayed; and as another example, the display of the message input control 302 at the bottom is maintained in the content sharing interface, and a region outside the message input control 302 is set to be the second preset region. As shown in a top right interface in FIG. 3, the playback of the clown video can be continued in the content sharing interface.

According to the message display method provided in the embodiment of the present disclosure, the content sharing interface is displayed in the content sharing event of the target users, wherein a number of target users is at least two, and the content sharing interface is used for displaying the preset media content shared among the target users and the interactive messages sent by the target users in the content sharing event; and in the process of displaying the interactive messages in the content sharing interface in the first preset mode, in response to the first trigger operation of the target users for triggering the input of the interactive messages, it is switched, in the content sharing interface, from displaying the interactive messages in the first preset mode to displaying the interactive messages in the second preset mode, wherein the display of the interactive messages in the first preset mode is associated with the receiving time of the interactive messages, and the display of the interactive messages in the second preset mode is associated with the interaction process data of the target users. By using the above embodiment, a plurality of users may perform interaction by means of sending messages in the process of checking the shared content and may switch between different message display modes, in the first preset mode, the display of the messages is associated with the receiving time, so that excessive occlusion of the shared content caused by the display of excessive interaction processes can be avoided, and after the users actively trigger the input of messages, the first preset mode is switched to the second preset mode, the display of the messages is associated with the interaction process data, so that the users can conveniently and quickly input messages with reference to the interaction process, thereby improving the interaction efficiency, and thus better taking into consideration of the viewing effect of the media content and the message interaction requirement of the users.

In some embodiments, the content sharing interface is further used for displaying a message input control; and the step: in response to the first trigger operation of the target users for triggering the input of the interactive messages, switching, in the content sharing interface, from displaying the interactive messages in the first preset mode to displaying the interactive messages in the second preset mode, includes: displaying a message input panel in the content sharing interface in response to a first trigger operation for the message input control, and switching from displaying the interactive messages in the first preset mode to displaying the interactive messages in the second preset mode, wherein an interactive message record is displayed in a region outside the message input panel in the content sharing interface. The advantage of such settings lies in that, after the first trigger operation is received, the message input panel and the interactive message record are displayed at the same time, thereby improving the message input efficiency. As shown in FIG. 3, after a user clicks the message input control 302, a message input panel 305 is displayed, and the interactive message record is displayed in the second preset region 304 above the message input panel 305.

In some embodiments, the step: displaying the message input panel in the content sharing interface, and switching from displaying the interactive messages in the first preset mode to displaying the interactive messages in the second preset mode, includes: displaying the message input panel, and displaying a preset control in the content sharing interface; and in response to a second trigger operation for the preset control, switching from displaying the interactive messages in the first preset mode to displaying the interactive messages in the second preset mode. The advantage of such settings lies in that, the user is supported to input messages without checking the interactive message record, thereby avoiding excessive occlusion of the preset media content caused by the display of the interactive message record, and the preset control is provided for the user at the same time, so that the user can switch to the second preset mode by means of triggering the preset control. Optionally, before the display message input panel is displayed and the preset control is not triggered, the interactive messages may be displayed in the first preset mode, so as to prevent the user from missing the latest interactive message. Optionally, before the display message input panel is displayed and the preset control is not triggered, the display of the interactive messages may also be stopped, so as to reduce the occlusion of the preset media content. The specific type of the second trigger operation may be set according to actual requirements, for example, may be a click or a long press, etc.

As shown in FIG. 3, after the user clicks the message input control 302, the user enters the following interface diagram to display the message input panel and a preset control 306, and after the user clicks the preset control 306, the user enters the top right interface diagram.

In some embodiments, in the first preset mode, the content sharing interface is further used for displaying user identifiers of the target users in a first display manner. The specific content of the user identifiers may be set according to actual requirements, for example, may include user names, user head portraits, or real-time video pictures of the users, etc. Optionally, the user identifiers of a first size of at least two target users are displayed in a set region in the content sharing interface, the set region may be understood as a region in the content sharing interface, which is used for displaying the user identifiers in a centralized mode, and when the number of the target users does not exceed a preset number threshold value, the user identifiers of all the target users may be displayed in the set region, so as to enhance the companion feeling.

Figure 4:
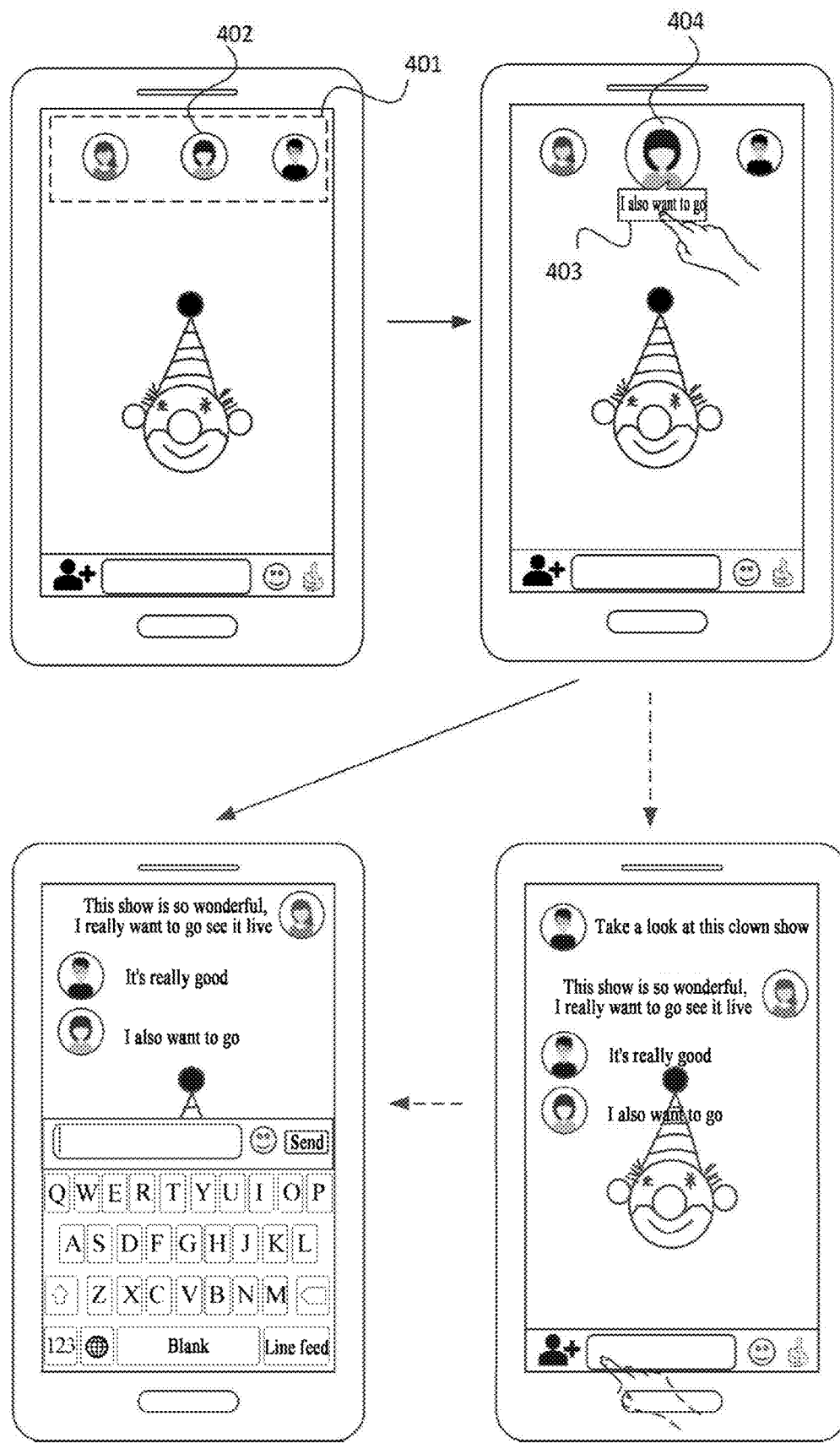
FIG. 4 is a schematic diagram of an interface change provided in an embodiment of the present disclosure.

FIG. 4 is a schematic diagram of an interface change provided in an embodiment of the present disclosure, as shown in a top left diagram in FIG. 4, the user identifiers of three target users are displayed in a set region 401 in a content sharing interface, and the size of the user identifiers may be denoted as a first size.

Exemplarily, upon receiving a first interactive message sent by a first target user, the first interactive message is displayed for a set duration at a first position associated with a first user identifier in the content sharing interface. As shown in FIG. 4, assuming that the first target user is the user A, a first user identifier 402 of the user A is shown in the top left diagram, after the user A sends the first interactive message "I also want to go", a first interactive message 403 "I also want to go" is displayed at the first position associated with a first user identifier 404 of the user A in the top right diagram.

In some embodiments, in the first preset mode, when the interactive message sent by the first target user is displayed, the display manner of the user identifier of the first target user is switched from the first display manner to a second display manner, and after the display of the interactive message sent by the first target user is stopped, the display manner of the user identifier of the first target user is recovered from the second display manner to the first display manner. The advantage of such settings lies in that, the user identifier of the target user who currently sends the message is differentially displayed with other user identifiers, so that the user can conveniently and quickly confirm the identity of the user who currently sends the interactive message. The specific difference between the first display manner and the second display manner may be set according to actual requirements, such as different sizes, different shapes, different colors or different transparency, etc. Optionally, the first display manner is to display the user identifier of a first size, the second display manner is to display the user identifier of a second size, and the second size is greater than the first size. As shown in FIG. 4, the size of the first user identifier 404 of the user A in the top right diagram is greater than the first user identifier 402 of the user A in the top left diagram.

In some embodiments, the step: in response to the first trigger operation of the target users for triggering the input of the interactive messages, switching, in the content sharing interface, from displaying the interactive messages in the first preset mode to displaying the interactive messages in the second preset mode, includes: in response to the first trigger operation of the target users for the input of the currently displayed interactive messages, switching to display the interactive messages in the content sharing interface in the second preset mode. The advantage of such settings lies in that, the switching manner of the interactive message display mode is enriched.

As shown in FIG. 4, after the user clicks the currently displayed interactive message 403, as an implementation, the user may enter a lower left interface; and as another implementation, the user may enter a lower right interface. Interactive message records are displayed in both the lower left interface and the lower right interface. In the lower left interface, a message input box is displayed while the interactive message record is displayed, so that the user can conveniently and quickly input messages; and in the lower right interface, the display of the message input control is maintained while the interactive message record is displayed, so that the occlusion of the preset media content by the message input panel is avoided, and in addition, more interactive message records can be displayed, and after the user clicks the message input control, the user enters the lower left interface, thereby facilitating the user to input messages.

In some embodiments, the interactive message record includes at least one of the following: interactive messages in the present content sharing event, and historical interactive messages of the target users in a historical content sharing event. The historical content sharing event may be understood as a content sharing event performed by the target users before the present content sharing, for example, the user A, the user B, and the user C also performed content sharing yesterday, and then the interactive message record of the three persons in the Yesterday's sharing process may also be displayed in the second preset mode. Optionally, when switching to the second preset mode, the interactive messages involved in the present content sharing event may be displayed by default, and after a preset operation such as downward sliding is received, historical interactive messages involved in the historical content sharing event may be sequentially displayed in a descending order of time.

In some embodiments, the preset application program may further support an instant messaging function, two or more users may perform a session through the instant messaging function, and in order to facilitate the communication, a session group (a group for short) may generally be set, the group may include at least two group members, and the preset application program may retain sessions in the group in a session list, which is referred to as a session record. In the embodiment of the present disclosure, if the target users are in one group at the same time, the session record in the group may be displayed in the content sharing interface, so that the users can conveniently check the historical communication conditions of the target users in the group. Optionally, the interaction process data of the target users further includes an original session record of a target group in a target session interface, and the target group is composed of the target users corresponding to the content sharing event. Optionally, in the process of displaying the interactive messages in the content sharing interface in the second preset mode, the method further includes: after a preset operation is received, displaying the interaction process data of the target users in the content sharing interface, wherein the interaction process data of the target users includes the original session record in the target group and the interactive message record of the content sharing event, and the target group is composed of the target users corresponding to the content sharing event. The original session record is an existing session record when the target group performs a session through the instant messaging function before the present content sharing event. The specific type of the preset operation may be set according to actual requirements, for example, may be a trigger operation for a session check control, and may also be a downward sliding operation, or the like. The specific display form of the preset session record may be different from that of the interactive message record, so as to facilitate the quick distinguishment of the users.

In some embodiments, the method further includes: exiting the content sharing interface; entering a target session interface of the target group, wherein the target group is composed of the target users corresponding to the content sharing event; and displaying a target session record in the target session interface, wherein the target session records includes the original session record of the target group in the target session interface and the interactive message record in the content sharing event, for example, including the original session record in the target group and the interactive message record in the content sharing event, which are sorted in a time sequence. The advantage of such settings lies in that, the interactive message record can be synchronized to the session interface, so that the users can conveniently check, in the session interface, the interaction content among the target users in different scenarios according to the time sequence.

In some embodiments, when the target session record is displayed, a first display manner of the original session record is different from a second display manner of the interactive message record. The advantage of such setting lies in that, the users can conveniently and quickly distinguish the interaction records in different scenarios. The specific difference between the first display manner and the second display manner may be set according to actual requirements, for example, may include detail degrees, display regions, font sizes, font colors, and the like.

In some embodiments, the method further includes at least one of the following: the first display manner includes: displaying the original session record one by one; and the second display manner includes: merging and displaying the interactive message record with a preset message identifier.

In some embodiments, the method further includes: displaying the interactive message record one by one in response to a third trigger operation for the preset message identifier. The advantage of such setting lies in that, the interactive message record is briefly displayed, so as to avoid occupying too much display space, and when the users need check detailed message content, details can be quickly checked by means of triggering the preset message identifier. The specific style of the preset message identifier may be set according to actual requirements, and exemplarily, the preset message identifier may be displayed in association with a time corresponding to the content sharing event.

Figure 5:
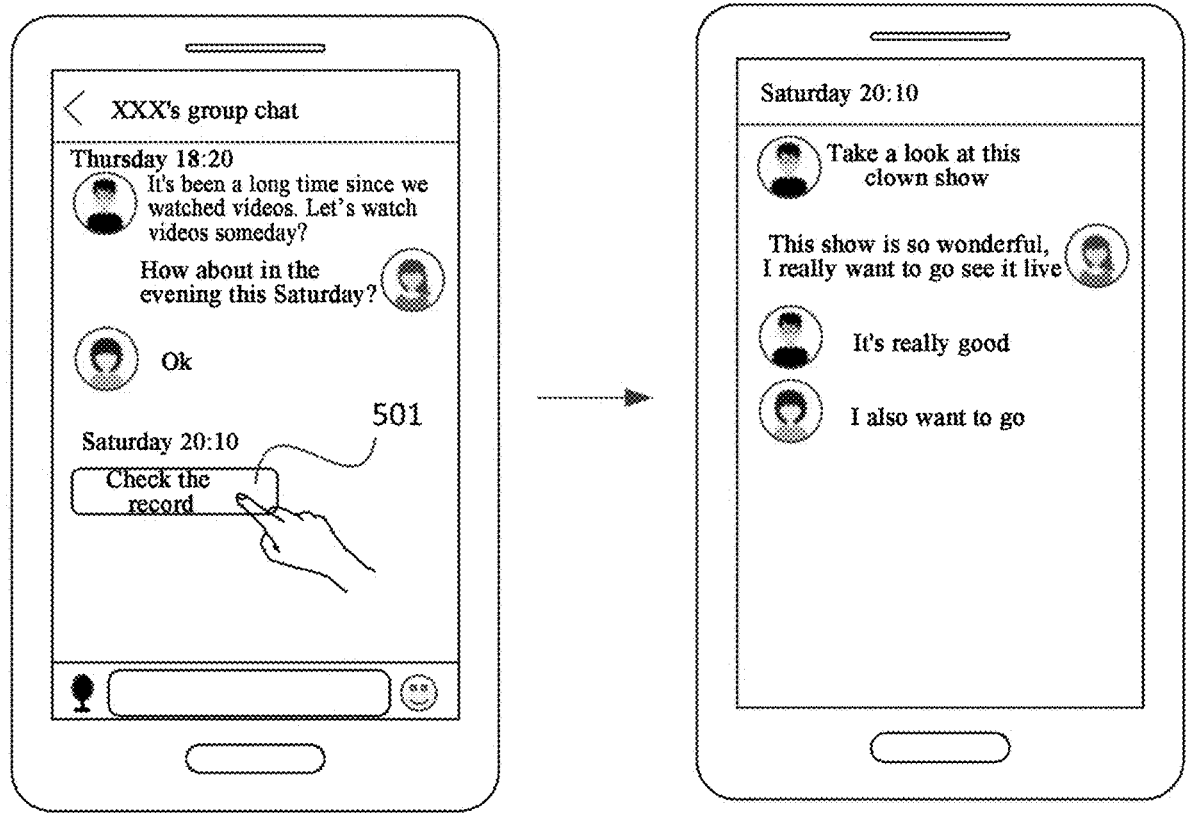
FIG. 5 is a schematic diagram of a change of a session interface provided in an embodiment of the present disclosure.

FIG. 5 is a schematic diagram of a change of a session interface provided in an embodiment of the present disclosure, as shown in FIG. 5, the target session record is displayed in the target session interface, the original session record is displayed one by one in the target session record according to a time sequence, and the interactive message record in the content sharing event is displayed in a form of a preset message identifier 501, and after the user clicks the preset message identifier 501, the user may check specific interactive message content.

In some embodiments, after exiting the content sharing interface, the method further includes: judging whether the target group exists, and in response to the absence of the target group, creating the target group and an initial session interface of the target group; and entering the initial session interface of the target group, and displaying, in the initial session interface, the interactive message record in the content sharing event. The advantage of such settings lies in that, if the target users are not in the same group before performing content sharing, the target group can be automatically created, so that the users can conveniently check the interactive message record in the content sharing event at any time in the session interface of the created target group. The initial session interface may be understood as a session interface displayed after the user triggers an operation of entering the session interface of the target group for the first time.

In some embodiments, in the process of displaying the interactive messages in the content sharing interface in the second preset mode, the method further includes: displaying, in the content sharing interface, a voice information record, which is input by the target users in the content sharing event, wherein the voice information in the voice information record and the interactive messages in the interactive message record are mixed and sorted according to a time sequence for display. The advantage of such settings lies in that, for a call sharing application scenario, at least two users participating in a call may communicate with each other in a voice manner, thereby saving the message input time and improving the interaction efficiency; however, in some cases, it may be not suitable for voice communication, for example, the voice communication may hinder the others in the surrounding or the surrounding environment is relatively noisy, and the like, at this time, the users may generally set call mute, and messages including visual information such as texts may better conform to the requirements of the users, therefore different target users participating in content sharing may select different communication modes according to actual situations of themselves, for example, one target user uses an interactive message manner, and the other target user uses a voice communication manner. In this way, when the interactive message record is checked, if only the interactive messages are displayed, the interaction process cannot be comprehensively reflected. In the embodiment of the present disclosure, the voice information in the voice information record and the interactive messages in the interactive message record are mixed and sorted according to the time sequence in the foregoing mode for display, so that the users can conveniently check a coherent interaction process. Optionally, the voice information may be displayed in the form of a voice identifier, for example, a strip-shaped voice identifier determined according to a voice duration, and voice content may be played after the users click the voice identifier; and the voice information may also be displayed in a text form, the voice may be converted into texts by using a voice recognition technology, and the texts are displayed in the interface, so that the users can conveniently and quickly check the voice content.

In some embodiments, a first display form of the same interactive message in the first preset mode is different from a second display form in the second preset mode. The specific difference between the first display form and the second display form may be set according to actual requirements, for example, may be detail degrees or font sizes, etc.

In some embodiments, the first display form includes: in the case that the character length of the currently displayed interactive message is greater than a preset length threshold value, performing thumbnail display on the currently displayed interactive message; and the second display form includes: completely displaying the currently displayed interactive message. The advantage of such settings lies in that, in the first preset mode, the interactive message with more content can be displayed in the thumbnail display manner, thereby avoiding excessive occlusion of the preset media content, and the interactive message is completely display in the second preset mode, so that the users can conveniently know message details. The thumbnail display manner may be set according to actual requirements, for example, latter message content and the like are replaced in the form of ellipsis, and the like. As shown in FIG. 4, "This show is so wonderful, I really want to go see it live", which has a large number of words, therefore when being displayed in the first display form, it may be displayed as "This show is so wonderful wonderful . . . ".

Figure 6:
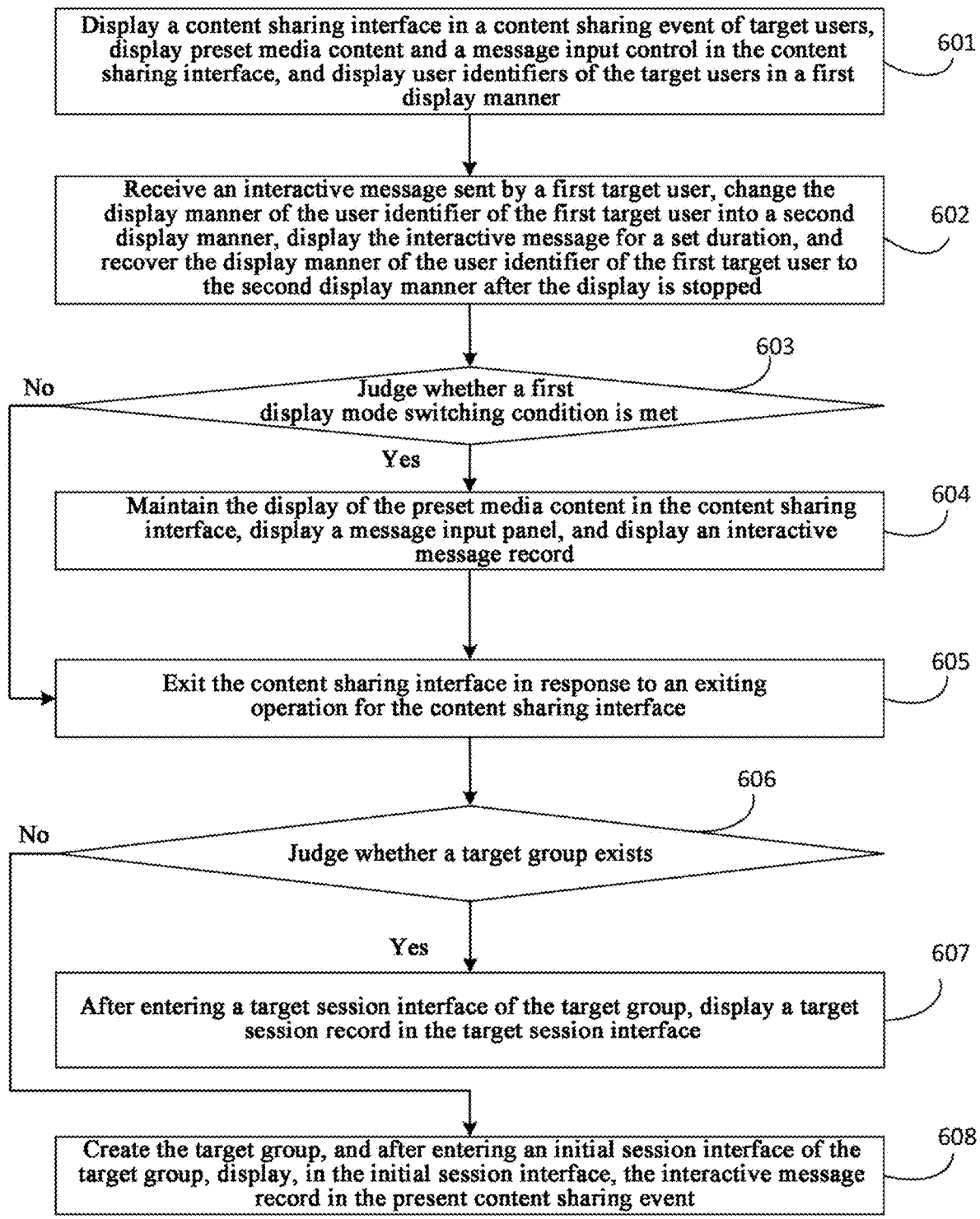
FIG. 6 is a schematic flowchart of a message display method provided in an embodiment of the present disclosure.

FIG. 6 is a schematic flowchart of a message display method provided in an embodiment of the present disclosure, the present embodiment is described on the basis of various optional solutions in the above embodiments, and the method includes the following steps:

Step 601, displaying a content sharing interface in a content sharing event of target users, displaying preset media content and a message input control in the content sharing interface, and displaying user identifiers of the target users in a first display manner.

There are at least two target users. Exemplarily, after entering the content sharing interface, interactive messages are first displayed in a first preset mode, and in the first preset mode, the users may better focus on viewing the shared content.

Step 602, receiving an interactive message sent by a first target user, changing the display manner of the user identifier of the first target user into a second display manner, displaying the interactive message for a set duration, and recovering the display manner of the user identifier of the first target user to the second display manner after the display is stopped.

Step 603, judging whether a first display mode switching condition is met, and executing step 604 in response to the first display mode switching condition being met; and executing step 605 in response to the first display mode switching condition being not met.

After it is determined that the first display mode switching condition is met, it may be switched from displaying the interactive message in the first preset mode to displaying the interactive message in a second preset mode, so that one user can comprehensively know the interaction situation between the users.

In the present embodiment, the first display mode switching condition may include: receiving a first trigger operation for the message input control, and may further include: receiving a third trigger operation for the currently displayed interactive message.

Step 604, maintaining the display of the preset media content in the content sharing interface, displaying a message input panel, and displaying an interactive message record.

In the present embodiment, the interactive message record includes interactive messages involved in the present content sharing event, and further includes historical interactive messages involved in a historical content sharing event of the target users. For example, the present interactive messages may be displayed at first, and earlier interactive messages are continuously displayed along with the reception of a sliding operation, and after the present interactive messages are completely displayed, the display of the historical interactive messages may be continued, and after the display of the historical interactive messages is completed, if one user continues to input the sliding operation, a preset session record may be displayed in the content sharing interface, wherein the preset session record includes a session record in a target group, and group members in the target group are the target users.

Optionally, after the message input panel is displayed, the preset media content may be displayed in the content sharing interface in the form of a small window, and the display region of the small window is located outside the message input panel, thereby avoiding the occlusion of the preset media content by the message input panel.

Optionally, in the process of displaying the interactive message record, whether a second display mode switching condition is met may be further judged, and in response to the second display mode switching condition being met, it is switched back to display the interactive messages in the first preset mode. The second display mode switching condition may be, for example, receiving a trigger operation for a preset switching control.

Step 605, exiting the content sharing interface in response to an exiting operation for the content sharing interface.

Step 606, judging whether the target group exists, and executing step 607 in response to the presence of the target group; and executing step 608 in response to the absence of the target group.

Step 607, after entering a target session interface of the target group, displaying a target session record in the target session interface.

In the present embodiment, the target session record includes the original session record in the target group and the interactive message record in the content sharing event, which are sorted according to a time sequence, the original session record is displayed one by one, the interactive message record is merged and displayed with a preset message identifier, and when a fourth trigger operation for the preset message identifier is received, the interactive message record is displayed one by one.

Step 608, creating the target group, and after entering an initial session interface of the target group, displaying, in the initial session interface, the interactive message record in the present content sharing event.

According to the message display method provided in the embodiment of the present disclosure, a plurality of users may perform interaction by means of sending messages in the process of checking the shared content and may switch between different message display modes, in the first preset mode, the currently received message is displayed within a limited time, so that excessive occlusion of the shared content caused by the display of more messages for a long time can be avoided; in addition, the user identifiers of the users participating in the sharing are displayed, the display manner of the user identifier of the user who currently sends the message is changed, so that one user can quickly locate the target user; after the message input control is triggered, or after the currently displayed message is triggered, it is switched to display a message record in the second preset mode, wherein the message record may include a historical message record and a session record in a group chat session, so that the user can conveniently and comprehensively understand the historical interaction conditions without performing interface switching, thereby improving the interaction efficiency, and well taking into consideration both the viewing effect of the media content and the message interaction requirements of the users; and after exiting the content sharing interface, the interactive message record may be synchronized into the group session, so that the users can conveniently review the interaction conditions in the content sharing event at any time through the group session.

Figure 7:
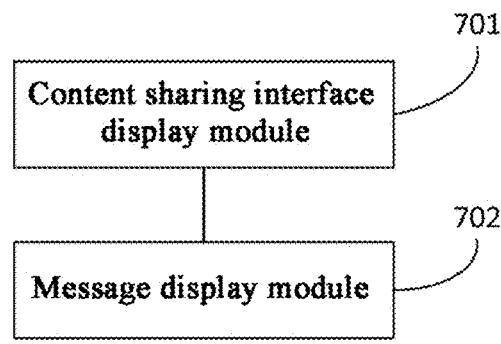
FIG. 7 is a structural block diagram of a message display apparatus provided in an embodiment of the present disclosure.

FIG. 7 is a structural block diagram of a message display apparatus provided in an embodiment of the present disclosure, the apparatus may be implemented by software and/or hardware, and may generally be integrated in an electronic device, and message display may be performed by executing a message display method. As shown in FIG. 7, the apparatus includes:

a content sharing interface display module 701, configured to display a content sharing interface in a content sharing event of target users, wherein a number of target users is at least two, and the content sharing interface is used for displaying preset media content shared among the target users and interactive messages sent by the target users in the content sharing event; and a message display module 702, configured to: in the process of displaying the interactive messages in the content sharing interface in a first preset mode, in response to a first trigger operation of the target users for triggering the input of the interactive messages, switch, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

According to the message display apparatus provided in the embodiment of the present disclosure, the content sharing interface is displayed in the content sharing event of the target users, wherein a number of target users is at least two, and the content sharing interface is used for displaying the preset media content shared among the target users and the interactive messages sent by the target users in the content sharing event; and in the process of displaying the interactive messages in the content sharing interface in the first preset mode, in response to the first trigger operation of the target users for triggering the input of the interactive messages, it is switched, in the content sharing interface, from displaying the interactive messages in the first preset mode to displaying the interactive messages in the second preset mode, wherein the display of the interactive messages in the first preset mode is associated with the receiving time of the interactive messages, and the display of the interactive messages in the second preset mode is associated with the interaction process data of the target users. By using the above embodiment, a plurality of users may perform interaction by means of sending messages in the process of checking the shared content and may switch between different message display modes, in the first preset mode, the display of the messages is associated with the receiving time, so that excessive occlusion of the shared content caused by the display of excessive interaction processes can be avoided, and after the users actively trigger the input of messages, the first preset mode is switched to the second preset mode, the display of the messages is associated with the interaction process data, so that the users can conveniently and quickly input messages with reference to the interaction process, thereby improving the interaction efficiency, and thus better taking into consideration of the viewing effect of the media content and the message interaction requirement of the users.

Optionally, the step of displaying the interactive messages in the first preset mode includes: displaying the currently received interactive messages for a set duration; and the step of displaying the interactive messages in the second preset mode includes: displaying an interactive message record.

Optionally, the content sharing interface is further used for displaying a message input control; and
 the message display module is configured to: in response to the first trigger operation of the target users for triggering the input of the interactive messages, switch to display the interactive messages in the content sharing interface in the second preset mode in the following way:
 in the process of displaying the interactive messages in the content sharing interface in the first preset mode, displaying a message input panel in the content sharing interface in response to a first trigger operation for the message input control, and switching from displaying the interactive messages in the first preset mode to displaying the interactive messages in the second preset mode, wherein the interactive message record is displayed in a region outside the message input panel in the content sharing interface.

Optionally, the step: displaying the message input panel in the content sharing interface, and switching from displaying the interactive messages in the first preset mode to displaying the interactive messages in the second preset mode, includes: displaying the message input panel, and displaying a preset control in the content sharing interface; and in response to a second trigger operation for the preset control, switching from displaying the interactive messages in the first preset mode to displaying the interactive messages in the second preset mode.

Optionally, the message display module is configured to: in response to the first trigger operation of the target users for triggering the input of the interactive messages, switch, in the content sharing interface, from displaying the interactive messages in the first preset mode to displaying the interactive messages in the second mode in the following way: in the process of displaying the interactive messages in the content sharing interface in the first preset mode, in response to the first trigger operation of the target users for inputting the currently displayed interactive messages, switching, in the content sharing interface, to display the interactive messages in the second preset mode.

Optionally, the apparatus further includes: a user identifier display module, configured to: when the interactive message sent by a first target user is displayed in the first preset mode, change the display manner of a user identifier of the first target user from a first display manner to a second display manner, and after the display of the interactive message sent by the first target user is stopped, recover the display manner of the user identifier of the first target user from the second display manner to the first display manner.

Optionally, the interactive message record includes at least one of the following: interactive messages in the present content sharing event, and historical interactive messages of the target users in a historical content sharing event.

Optionally, the interaction process data of the target users further includes an original session record of a target group in a target session interface, and the target group is composed of the target users corresponding to the content sharing event.

Optionally, the apparatus further includes:
 a content sharing interface exit module, configured to exit the content sharing interface; and
 a session interface entry module, configured to enter a target session interface of the target group, wherein the target group is composed of the target users corresponding to the content sharing event; and
 a session record display module, configured to display a target session record in the target session interface, wherein the target session record includes the original session record of the target group in the target session interface and the interactive message record in the content sharing event.

Optionally, when the target session record is displayed, a first display manner of the original session record is different from a second display manner of the interactive message record.

Optionally, the apparatus further includes at least one of the following:
 the first display manner includes: displaying the original session record one by one; and
 the second display manner includes: merging and displaying the interactive message record with a preset message identifier.

Optionally, the apparatus further includes:
 an interactive message display module, configured to display the interactive message record one by one in response to a fourth trigger operation for the preset message identifier.

Optionally, the apparatus further includes:
 a group creation module, configured to: after exiting the content sharing interface, judge whether the target group exists, and in response to the absence of the target group, create the target group and an initial session interface of the target group; and
 an initial session interface display module, configured to enter the initial session interface of the target group, and display, in the initial session interface, the interactive message record in the content sharing event.

Optionally, the apparatus further includes:
 a voice record display module, configured to: in the process of displaying the interactive messages in the content sharing interface in the second preset mode, display, in the content sharing interface, a voice information record, which is input by the target users in the content sharing event, wherein the voice information in the voice information record and the interactive messages in the interactive message record are mixed and sorted according to a time sequence for display.

Optionally, a first display form of the same interactive message in the first preset mode is different from a second display form in the second preset mode.

Optionally, the apparatus further includes at least one of the following:
 the first display form includes: in the case that the character length of the currently displayed interactive message is greater than a preset length threshold value, performing thumbnail display on the currently displayed interactive message; and the second display form includes: completely displaying the currently displayed interactive message.

Optionally, in the process of displaying the interactive messages in the content sharing interface in the first preset mode, and in the process of displaying the interactive messages in the content sharing interface in the second preset mode, the display of the preset media content is maintained in the content sharing interface.

Figure 8:
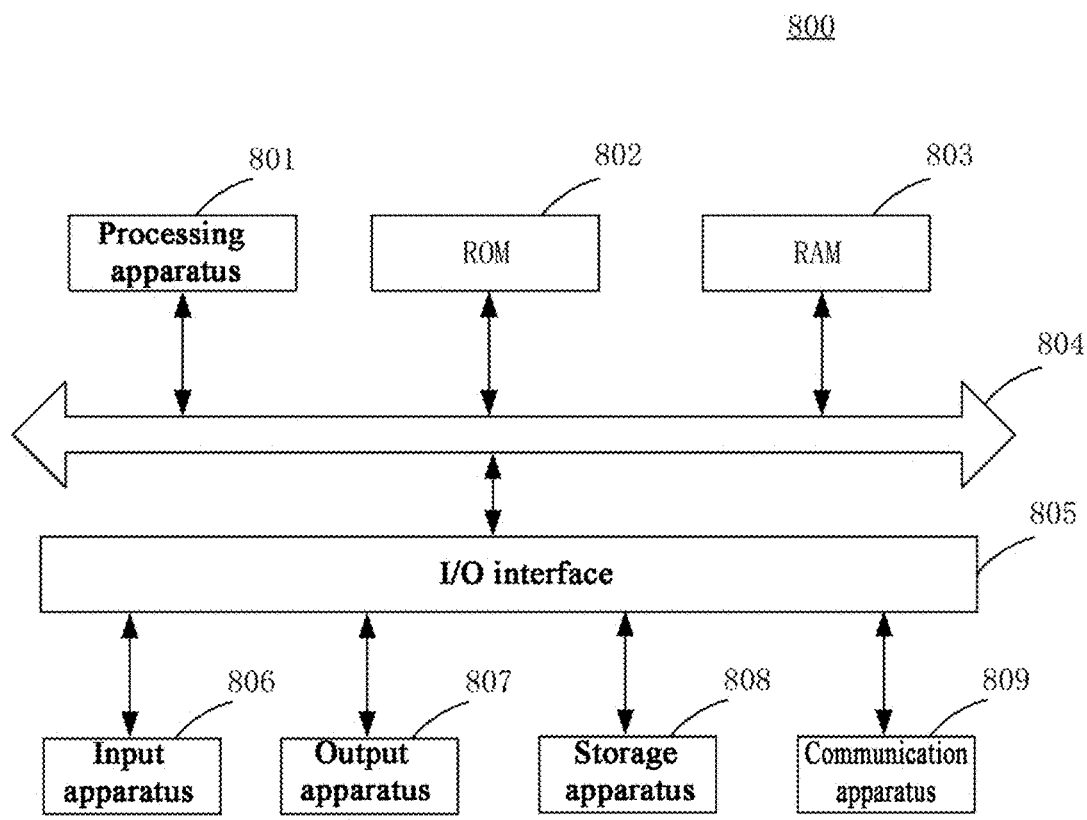
FIG. 8 is a structural block diagram of an electronic device provided in an embodiment of the present disclosure.

Referring to FIG. 8 below, it illustrates a schematic structural diagram of an electronic device 800 suitable for implementing the embodiments of the present disclosure. The electronic device in the embodiment of the present disclosure may include mobile terminals such as mobile phones, notebook computers, digital broadcast receivers, personal digital assistants (PDAs), portable Android devices (PADs), portable media players (PMPs), vehicle-mounted terminals (e.g., vehicle-mounted navigation terminals), and the like, and fixed terminals such as digital televisions (TVs), desktop computers, and the like. The electronic device shown in FIG. 8 is merely an example.

As shown in FIG. 8, the electronic device 800 may include a processing apparatus (e.g., a central processing unit, a graphics processing unit, or the like) 801, and the electronic device 800 may perform various suitable actions and processes in accordance with a program stored in a read-only memory (ROM) 802 or a program loaded from a storage apparatus 808 into a random access memory (RAM) 803. In the RAM 803, various programs and data needed by the operations of the electronic device 800 are also stored. The processing apparatus 801, the ROM 802 and the RAM 803 are connected to each other via a bus 804. An input/output (I/O for short) interface 805 is also connected to the bus 804.

In general, the following apparatuses may be connected to the I/O interface 805: an input apparatus 806, including, for example, a touch screen, a touch pad, a keyboard, a mouse, a camera, a microphone, an accelerometer, a gyroscope, and the like; an output apparatus 807, including, for example, a liquid crystal display (LCD), a speaker, a vibrator, and the like; a storage apparatus 808, including, for example, a magnetic tape, a hard disk, and the like; and a communication apparatus 809. The communication apparatus 809 may allow the electronic device 800 to communicate in a wireless or wired manner with other devices to exchange data. Although FIG. 8 illustrates the electronic device 800 having various apparatuses, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a non-transient computer-readable medium, and the computer program contains program codes for executing the method illustrated in the flowcharts. In such embodiments, the computer program may be downloaded and installed from a network via the communication apparatus 809, or installed from the storage apparatus 808, or installed from the ROM 802. When the computer program is executed by the processing apparatus 801, the above functions defined in the method of the embodiments of the present disclosure are executed.

It should be noted that, the computer-readable medium described above in the present disclosure may be either a computer-readable signal medium or a computer-readable storage medium, or any combination of the two. The computer-readable storage medium may be, for example, an electrical, magnetic, optical, electromagnetic, infrared, or semiconductor system, apparatus or device, or a combination of any of the above. More specific examples of the computer-readable storage medium may include: an electrical connection having one or more wires, a portable computer magnetic disk, a hard disk, an RAM, an ROM, an erasable programmable read-only memory (EPROM or a flash memory), an optical fiber, a portable compact disc read-only memory (CD-ROM), an optical storage device, a magnetic storage device, or any suitable combination of the above. In the present disclosure, the computer-readable storage medium may be any tangible medium that contains or stores a program, wherein the program may be used by or in combination with an instruction execution system, apparatus or device. In the present disclosure, the computer-readable signal medium may include a data signal that is propagated in a baseband or used as part of a carrier, wherein the data signal carries computer-readable program codes. Such propagated data signal may take many forms, including electromagnetic signals, optical signals, or any suitable combination thereof. The computer-readable signal medium may also be any computer-readable medium other than the computer-readable storage medium, and the computer-readable signal medium may send, propagate or transport the program for use by or in combination with the instruction execution system, apparatus or device. Program codes contained on the computer-readable medium may be transmitted with any suitable medium, including: an electrical wire, an optical cable, radio frequency (RF), and the like, or any suitable combination thereof.

The computer-readable medium may be contained in the above electronic device; and it may also be present separately and is not assembled into the electronic device.

The computer-readable medium carries one or more programs that, when being executed by the electronic device, cause the electronic device to perform the following operations: displaying a content sharing interface in a content sharing event of target users, wherein a number of target users is at least two, and the content sharing interface is used for displaying preset media content shared among the target users and interactive messages sent by the target users in the content sharing event; and in the process of displaying the interactive messages in the content sharing interface in a first preset mode, in response to a first trigger operation of the target users for triggering the input of the interactive messages, switching, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the blocks may occur out of the sequence annotated in the drawings. For example, two blocks shown in succession may in fact, be executed substantially concurrently, or the blocks may sometimes be executed in a reverse sequence, depending upon the functions involved. It should also be noted that each block in the block diagrams and/or flowcharts, and combinations of the blocks in the block diagrams and/or flowcharts may be implemented by dedicated hardware-based systems for executing specified functions or operations, or combinations of dedicated hardware and computer instructions.

The modules involved in the described embodiments of the present disclosure may be implemented in a software or hardware manner. The names of the modules do not constitute limitations of the modules themselves in a certain case. For example, the content sharing interface display module may also be described as "a module for displaying a content sharing interface in a content sharing event of target users, wherein a number of target users is at least two, and the content sharing interface is used for displaying preset media content shared among the target users and interactive messages sent by the target users in the content sharing event".

The functions described herein above may be executed, at least in part, by one or more hardware logic components. For example, example types of the hardware logic components that may be used include: a field programmable gate array (FPGA), an application specific integrated circuit (ASIC), application specific standard parts (ASSPs), a system on chip (SOC), a complex programmable logic device (CPLD), and so on.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include, an electronic, magnetic, optical, electromagnetic, infrared, or semiconductor system, apparatus or device, or any suitable combination thereof. The machine-readable storage medium may include an electrical connection based on one or more wires, a portable computer disk, a hard disk, an RAM, an ROM, an erasable programmable read only memory (EPROM or a flash memory), an optical fiber, a CD-ROM, an optical storage device, a magnetic storage device, or any suitable combination thereof.

According to one or more embodiments of the present disclosure, provided is a message display method, including:

displaying a content sharing interface in a content sharing event of target users, wherein a number of target users is at least two, and the content sharing interface is used for displaying preset media content shared among the target users and interactive messages sent by the target users in the content sharing event; and in the process of displaying the interactive messages in the content sharing interface in a first preset mode, in response to a first trigger operation of the target users for triggering the input of the interactive messages, switching, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

In one embodiment, the step of displaying the interactive messages in the first preset mode includes: displaying the currently received interactive messages for a set duration; and the step of displaying the interactive messages in the second preset mode includes: displaying an interactive message record.

In one embodiment, the content sharing interface is further used for displaying a message input control; and the step: in response to the first trigger operation of the target users for triggering the input of the interactive messages, switching, in the content sharing interface, from displaying the interactive messages in the first preset mode to displaying the interactive messages in the second preset mode, includes:

displaying a message input panel in the content sharing interface in response to a first trigger operation for the message input control, and switching from displaying the interactive messages in the first preset mode to displaying the interactive messages in the second preset mode, wherein the interactive message record is displayed in a region outside the message input panel in the content sharing interface.

In one embodiment, the step: displaying the message input panel in the content sharing interface, and switching from displaying the interactive messages in the first preset mode to displaying the interactive messages in the second preset mode, includes:

displaying the message input panel, and displaying a preset control in the content sharing interface; and in response to a second trigger operation for the preset control, switching from displaying the interactive messages in the first preset mode to displaying the interactive messages in the second preset mode.

In one embodiment, the first trigger operation of the target users for triggering the input of the interactive messages includes:

a first trigger operation of the target users for the input of the currently displayed interactive messages.

In one embodiment, when the interactive message sent by a first target user is displayed in the first preset mode, the display manner of a user identifier of the first target user is changed from a first display manner into a second display manner, and after the display of the interactive message sent by the first target user is stopped, the display manner of the user identifier of the first target user is recovered from the second display manner to the first display manner.

In one embodiment, the interactive message record includes at least one of the following: interactive messages in the present content sharing event, and historical interactive messages of the target users in a historical content sharing event.

In one embodiment, the interaction process data of the target users further includes an original session record of a target group in a target session interface, and the target group is composed of the target users corresponding to the content sharing event.

In one embodiment, the method further includes:
exiting the content sharing interface;
entering a target session interface of the target group, wherein the target group is composed of the target users corresponding to the content sharing event; and
displaying a target session record in the target session interface, wherein the target session record includes the original session record of the target group in the target session interface and the interactive message record in the content sharing event.

In one embodiment, when the target session record is displayed, a first display manner of the original session record is different from a second display manner of the interactive message record.

In one embodiment, the method further includes at least one of the following:
the first display manner includes: displaying the original session record one by one; and
the second display manner includes: merging and displaying the interactive message record with a preset message identifier.

In one embodiment, the method further includes: displaying the interactive message record one by one in response to a third trigger operation for the preset message identifier.

In one embodiment, after exiting the content sharing interface, the method further includes:
judging whether the target group exists, and in response to the absence of the target group, creating the target group and an initial session interface of the target group; and
entering the initial session interface of the target group, and displaying, in the initial session interface, the interactive message record in the content sharing event.

In one embodiment, in the process of displaying the interactive messages in the content sharing interface in the second preset mode, the method further includes:
displaying, in the content sharing interface, a voice information record, which is input by the target users in the content sharing event, wherein the voice information in the voice information record and the interactive messages in the interactive message record are mixed and sorted according to a time sequence for display.

In one embodiment, a first display form of the same interactive message in the first preset mode is different from a second display form in the second preset mode.

In one embodiment, the method further includes at least one of the following:
the first display form includes: in the case that the character length of the currently displayed interactive message is greater than a preset length threshold value, performing thumbnail display on the currently displayed interactive message; and
the second display form includes: completely displaying the currently displayed interactive message.

In one embodiment, in the process of displaying the interactive messages in the content sharing interface in the first preset mode, and in the process of displaying the interactive messages in the content sharing interface in the second preset mode, the display of the preset media content is maintained in the content sharing interface.

According to one or more embodiments of the present disclosure, provided is a message display apparatus, including:
a content sharing interface display module, configured to display a content sharing interface in a content sharing event of target users, wherein a number of target users is at least two, and the content sharing interface is used for displaying preset media content shared among the target users and interactive messages sent by the target users in the content sharing event; and
a message display module, configured to: in the process of displaying the interactive messages in the content sharing interface in a first preset mode, in response to a first trigger operation of the target users for triggering the input of the interactive messages, switch, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users.

The invention claimed is:

1. A message display method, comprising:
displaying a content sharing interface in a content sharing event of target users in a preset application program, wherein a number of target users is at least two, and the content sharing interface is used for displaying preset media content shared among the target users and interactive messages sent by the target users in the content sharing event;
in a process of displaying the interactive messages in the content sharing interface in a first preset mode, in response to a first trigger operation of the target users for inputting the interactive messages, switching, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users;
in response to redirecting to a session interface of the preset application program from the content sharing interface, determining whether a target group exists, wherein the target group is composed of the target users corresponding to the content sharing event;
in response to determining an absence of the target group, creating the target group in the preset application program and displaying an initial session interface of the target group; and
displaying, in the initial session interface, an interactive message record in the content sharing event.

2. The method according to claim 1, wherein displaying the interactive messages in the first preset mode comprises:
displaying the interactive messages for a set duration, respectively; and
wherein displaying the interactive messages in the second preset mode comprises:
displaying the interactive message record.

3. The method according to claim 1, wherein the content sharing interface is further used for displaying a message input control; and in response to the first trigger operation of the target users for triggering the input of the interactive messages, switching, in the content sharing interface, from displaying the interactive messages in the first preset mode to displaying the interactive messages in the second preset mode, comprises:
displaying a message input panel in the content sharing interface in response to a first trigger operation for the message input control, and switching from displaying the interactive messages in the first preset mode to displaying the interactive messages in the second preset mode, wherein the interactive message record is displayed in a region outside the message input panel in the content sharing interface.

4. The method according to claim 3, wherein displaying the message input panel in the content sharing interface, and switching from displaying the interactive messages in the first preset mode to displaying the interactive messages in the second preset mode, comprises:
displaying the message input panel and displaying a preset control in the content sharing interface; and
in response to a second trigger operation for the preset control, switching from displaying the interactive messages in the first preset mode to displaying the interactive messages in the second preset mode.

5. The method according to claim 1, wherein the first trigger operation of the target users for triggering the input of the interactive messages comprises:
a first trigger operation of the target users for the input of a displayed interactive messages of the interactive messages.

6. The method according to claim 1, further comprising:
when an interactive message sent by a first target user is displayed in the first preset mode, changing a display manner of a user identifier of the first target user from a first display manner into a second display manner, and after the display of the interactive message sent by the first target user is stopped, recovering the display manner of the user identifier of the first target user from the second display manner to the first display manner.

7. The method according to claim 1, wherein the interactive message record comprises at least one of the following:
interactive messages in a present content sharing event, or historical interactive messages of the target users in a historical content sharing event.

8. The method according to claim 1, wherein the interaction process data of the target users further comprises an original session record of the target group in a target session interface, and the target group is composed of the target users corresponding to the content sharing event.

9. The method according to claim 1, further comprising:
exiting the content sharing interface;
entering a target session interface of the target group; and
displaying a target session record in the target session interface, wherein the target session record comprises an original session record of the target group in the target session interface and the interactive message record in the content sharing event.

10. The method according to claim 9, wherein when the target session record is displayed, a first display manner of the original session record is different from a second display manner of the interactive message record.

11. The method according to claim 10, wherein the method further comprises at least one of the following:
the first display manner comprises: displaying the original session record one by one; and
the second display manner comprises: merging and displaying the interactive message record with a preset message identifier.

12. The method according to claim 11, wherein the method further comprises:
displaying the interactive message record one by one in response to a third trigger operation for the preset message identifier.

13. The method according to claim 1, wherein the method further comprises, in the process of displaying the interactive messages in the content sharing interface in the second preset mode:
displaying, in the content sharing interface, a voice information record, which is input by the target users in the content sharing event, wherein a voice information in the voice information record and the interactive messages in the interactive message record are mixed and sorted according to a time sequence for display.

14. The method according to claim 1, wherein a first display form of a same interactive message in the first preset mode is different from a second display form in the second preset mode.

15. The method according to claim 14, wherein the method further comprises at least one of the following:
the first display form comprises: in a case that a character length of a displayed interactive message of the interactive messages is greater than a preset length threshold value, performing thumbnail display on the displayed interactive message; or
the second display form comprises: completely displaying the displayed interactive message.

16. The method according to claim 1, further comprising:
in the process of displaying the interactive messages in the content sharing interface in the first preset mode, and in the process of displaying the interactive messages in the content sharing interface in the second preset mode, maintaining the display of the preset media content in the content sharing interface.

17. An electronic device, comprising:
a memory;
a processor; and
a computer program stored on the memory and executable on the processor, wherein the processor when executing the computer program is configured to:
display a content sharing interface in a content sharing event of target users in a preset application program, wherein a number of target users is at least two, and the content sharing interface is used for displaying preset media content shared among the target users and interactive messages sent by the target users in the content sharing event;
in a process of displaying the interactive messages in the content sharing interface in a first preset mode, in response to a first trigger operation of the target users for triggering an input of the interactive messages, switch, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users;
in response to redirecting to a session interface of the preset application program from the content sharing interface, determine whether a target group exists, wherein the target group is composed of the target users corresponding to the content sharing event;

in response to determining an absence of the target group, create the target group in the preset application program and display an initial session interface of the target group; and display, in the initial session interface, an interactive message record in the content sharing event.

18. The electronic device according to claim 17, wherein displaying the interactive messages in the first preset mode comprises:

displaying the currently received interactive messages for a set duration; and wherein displaying the interactive messages in the second preset mode comprises:

displaying the interactive message record.

19. A non-transitory computer-readable storage medium having a computer program stored thereon, wherein the computer program, when executed by a processor, cause the processor to:

display a content sharing interface in a content sharing event of target users in a preset application program, wherein a number of target users is at least two, and the content sharing interface is used for displaying preset media content shared among the target users and interactive messages sent by the target users in the content sharing event;

in a process of displaying the interactive messages in the content sharing interface in a first preset mode, in response to a first trigger operation of the target users for triggering an input of the interactive messages, switch, in the content sharing interface, from displaying the interactive messages in the first preset mode to displaying the interactive messages in a second preset mode, wherein the display of the interactive messages in the first preset mode is associated with receiving time of the interactive messages, and the display of the interactive messages in the second preset mode is associated with interaction process data of the target users;

in response to redirecting to a session interface of the preset application program from the content sharing interface, determine whether a target group exists, wherein the target group is composed of the target users corresponding to the content sharing event;

in response to determining an absence of the target group, create the target group in the preset application program and display an initial session interface of the target group; and display, in the initial session interface, an interactive message record in the content sharing event.

\* \* \* \* \*